(12) United States Patent
Jalava

(10) Patent No.: US 9,405,052 B1
(45) Date of Patent: Aug. 2, 2016

(54) OPTICAL FAN LIGHT COUPLER

(71) Applicant: Modilis Holdings LLC, Wilmington, DE (US)

(72) Inventor: Juho Ilkka Jalava, Salo (FI)

(73) Assignee: Modilis Holdings LLC, Wilmington, DE (US)

( * ) Notice: Subject to any disclaimer, the term of this patent is extended or adjusted under 35 U.S.C. 154(b) by 357 days.

(21) Appl. No.: 13/931,193

(22) Filed: Jun. 28, 2013

(51) Int. Cl.
*G02B 6/00* (2006.01)
*F21V 8/00* (2006.01)

(52) U.S. Cl.
CPC ............ *G02B 6/0028* (2013.01); *G02B 6/0013* (2013.01)

(58) Field of Classification Search
CPC ............ G02B 6/26; G02B 6/30; G02B 6/305; G02B 6/0013; G02B 6/0023; G02B 6/0028
USPC .......................................... 362/600
See application file for complete search history.

(56) References Cited

U.S. PATENT DOCUMENTS

| | | | |
|---|---|---|---|
| 2011/0227487 A1* | 9/2011 | Nichol et al. | 315/158 |
| 2013/0235608 A1* | 9/2013 | Tsai | G02B 6/0008 362/551 |
| 2014/0049983 A1* | 2/2014 | Nichol | G02B 6/0018 362/610 |
| 2014/0056028 A1* | 2/2014 | Nichol | G02B 6/0028 362/611 |

OTHER PUBLICATIONS

Matsumoto, "Light Guide Technology for Thinner", OptiOpto Ltd., Mar. 26, 2013, pp. 1-8.

* cited by examiner

*Primary Examiner* — Sean Gramling
*Assistant Examiner* — Gerald J Sufleta, II
(74) *Attorney, Agent, or Firm* — Lee & Hayes, PLLC

(57) ABSTRACT

The subject matter disclosed herein relates to an optical device comprising: a transparent foil including a series of ridges and furrows, a first distal portion configured to receive light, and a second distal portion to emit at least a portion of the received light, wherein the series of ridges and furrows diverges in a direction from the first distal portion to the second distal portion.

17 Claims, 8 Drawing Sheets

OPTICAL FAN LIGHT COUPLER

BACKGROUND

Electronic displays typically use a light source to shine light onto a display to improve visibility of content on the display. For example, many electronic devices use backlights that light up a display to enable a viewer to see content on the display that would otherwise be difficult to see without the backlights. In another example, reflective displays can use frontlights to improve visibility of content on displays, particularly in low light situations.

Electronic displays can incorporate one or more light guides to direct light from a light source onto or through a display, for example. In some applications, a light source can be relatively small, such as a light-emitting diode (LED). In conventional in-coupling, LEDs are placed close to an edge of a light guide film and light couples in to the light guide film. When the light guide film is made thinner than the light source, the amount of light that can be coupled inside the light guide is greatly reduced, which wastes electrical power.

A light back plane of an LCD display device typically includes a light guide film. Physical dimensions of a light guide film can be described by length A, width B and thickness C, and terms "length," "width" and "thickness" are relative terms. Generally, length A and width B are much greater than thickness C. A size (e.g., height or width) of a light source is typically an order of magnitude greater than a thickness C of a light guide film. A light source emits light from an area of more than about one square millimeter while a thickness of a light guide film may be less than about 0.5 millimeters. Thus, such a light source can be substantially larger than a height of an edge or end-face of a light guide film. Moreover, a light source typically emits light over a relatively large angular range. Angular distribution of light emitted by an LED can include a cone that subtends a relatively wide angle (e.g., about 30 degrees, in one example implementation). Accordingly, though it may be desirable to inject all light emitted by a light source into a light guide film, a large portion of the light is often not successfully injected into a thin light guide film.

BRIEF DESCRIPTION OF THE DRAWINGS

The detailed description is described with reference to non-limiting and non-exhaustive embodiments shown in the accompanying figures. The same reference numerals in different figures refer to similar or identical items.

DETAILED DESCRIPTION

Overview

Figure 1:
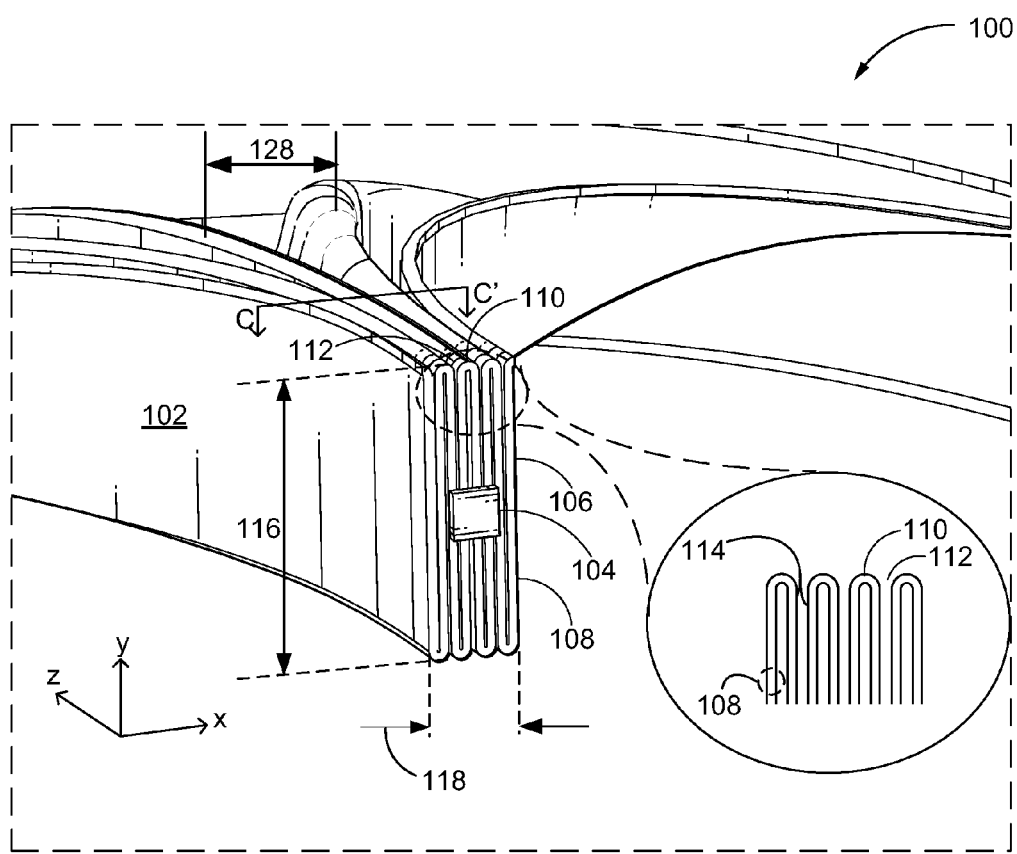
FIG. 1 is a perspective view of a fan light coupler and a light source, according to various embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments herein describe a number of apparatuses and techniques for coupling light from a light source into a light guide film. For example, a light source can include a light emitting diode (LED) that produces light from a relatively small area into a relatively wide angular distribution. Herein, a light source that produces such diverging light is called a "divergent-light source." Meanwhile, edges of a substantially planar light guide film present a relatively small area in which to receive light. Accordingly, in various embodiments a light coupler can be used to receive light from a light source, such as an LED, and inject the light into a light guide film. Such a light coupler can be formed from a transparent foil configured into a fan shape. The techniques and apparatuses described herein may be implemented in a number of ways. Example implementations are provided below with reference to the above-mentioned figures.

In some embodiments, a light coupler can include a transparent foil formed in a series of ridges and furrows. Foils generally include a material having one dimension substantially less than the other two dimensions. For example, a transparent foil can have a thickness in a range of about 0.025 to 2.0 millimeters. In some embodiments, the transparent foil can have a thickness of about 0.1 millimeter. As used herein, material that is "transparent" means a material in which light can propagate through the material with relatively low loss to absorption. For example, in some embodiments, about less than 10% of light travelling through a transparent material can be lost to absorption and/or scattering, though claimed subject matter is not limited in this respect. In a particular implementation, transparent material can comprise glass, polymethyl methacrylate (PMMA), polycarbonate (PC), optical grade PET, silicone, or other plastic materials, though any of a number of other materials can be used.

Herein, light discussed in various embodiments need not be limited to the visible portion of the spectrum. Instead, light can include electromagnetic radiation in any portion of the spectrum, including ultra-violet, visible and infrared.

A foil includes a first distal portion configured to receive light, and a second distal portion to emit at least a portion of the received light. The shape of the foil transitions from a tightly folded comparatively tall and narrow configuration at the first distal portion to a comparatively substantially flat and wide configuration at the second distal portion. Such a shape transition is well-suited to capture light from a divergent-light source and inject the light into a relatively thin light guide film. For example, the second distal portion can be optically coupled to a planar light guide film. Herein, "optically coupled" can be used to refer to two or more portions of an assembly that are mutually arranged so that light in one portion can travel into another portion. For example, a light coupler can be optically coupled to a light guide film by the light coupler and the light guide film being physically connected to each other. In another related example, a light coupler can be optically coupled to a light guide film when the light coupler and the light guide film are physically separated from each other, by a relatively small gap (e.g., less than several millimeters). Even though, in this case, transferring light from the light coupler to the light guide film can be less efficient compared to the case where the light coupler and the light guide film contact each other, the light coupler and the light guide film are nevertheless optically coupled to each other.

A series of ridges and furrows of a foil light coupler can diverge in a direction from a first distal portion (that receives light) to a second distal portion (that emits the light). For example, such a light coupler can have a fan shape, having a greater width at the second distal portion than at the first distal portion, as described below. Moreover, a height of the series of ridges and furrows can converge in a direction from the first distal portion to the second distal portion. For example, a light coupler can have a greater thickness at the first distal portion than at the second distal portion, though claimed subject matter is not so limited. The first distal portion can include a substantially flat end-face to receive an LED die (e.g., an LED chip).

As used herein, "diverging in a direction from point A to point B" means that sizes, distances, and/or dimensions increase as one approaches point B (or conversely, decrease as one moves toward point A). Also, "converging in a direction from point A to point B" means that sizes, distances, and/or dimensions decrease as one approaches point B (or conversely, increase as one moves toward point A). For example, a width of a light coupler can be 5.0 millimeters at point A and 15.0 millimeters at point B. The width halfway between points A and B need not be 10.0 millimeters, which would be the case if the width changed linearly. In some embodiments, the width of a light coupler can change nonlinearly. In another example, a height of a light coupler can be 5.0 millimeters at point A and 1.0 millimeters at point B. The height halfway between points A and B need not be 3.0 millimeters, which would be the case if the height changed linearly. In various embodiments, the height of a light coupler can change nonlinearly.

A foil light coupler operates by receiving light into a first distal portion of a transparent foil and transmitting the light to a second distal portion of the transparent foil. The foil light coupler includes a series of ridges and furrows that horizontally diverge in a direction from the first distal portion to the second distal portion so as to correspondingly diverge the transmitting light. On the other hand, the series of ridges and furrows vertically converge in the direction from the first distal portion to the second distal portion so as to correspondingly converge the transmitting light. In other words, such a light coupler spreads the light in a horizontal direction while "squeezing" the light in a vertical direction. Accordingly, the light coupler provides a useful technique for injecting light into a relatively thin edge of a light guide film.

In some implementations, a light coupler is optically coupled to a light guide film. In such a case, a second distal portion of the light coupler can be welded to an edge portion of the light guide film. In an example, such a weld can involve optically index matching a physical bond between the light coupler and the light guide film. Thus, light travelling in the light coupler can be injected into the light guide film with little, if any, light loss (e.g., less than several percent).

In some implementations, a light coupler is optically coupled to an LED die. In such a case, a first distal portion of the light coupler can be placed adjacent to the LED die. In one example, the LED die can be physically held against a substantially flat end-face of the first distal portion. Thus, light produced by the LED die can be injected into the light coupler with little, if any, light loss.

In an embodiment, a technique for injection light produced by an LED die into a light guide film can be used for operation of a display or illumination device, such as a reflective or transmissive LCD display, E-ink front light display, illuminated indicators/symbols/decorative icons, and any device that uses back or front lighting for illumination. Such a technique can include fabricating a light coupler comprising a transparent foil including a series of ridges and furrows that diverge in a first direction and converge in a second direction substantially perpendicular to the first direction. For example, such ridges and furrows can diverge horizontally and converge vertically, though, of course, "horizontal" and "vertical" are terms merely describing directions or orientations relative to one another. An output portion of the light coupler can be optically coupled to the light guide film. For example, such optical coupling can involve welding the output portion to an edge portion of the light guide film. Meanwhile, the LED die can be placed adjacently to an input portion of the light coupler. Applying electrical current to the LED die illuminates the LED die so as to produce light that enters the light coupler and travels in the light coupler toward the light guide film. For example, the light can travel in the light coupler via total internal reflection (e.g., similar to the way light travels in an optical fiber).

A foil light coupler provides a number of benefits. For example, a size of an end-face of a foil light coupler can be readily configured to receive any of a number of types of LED's having a wide power range. For example, a relatively high-powered LED (e.g., several watts or more) optically coupled to an end-face of a light coupler injects a relatively large amount of light into a light guide film that can allow for a relatively bright display of a display device. Another benefit of a foil light coupler is that light injected into a light guide film from such a light coupler can illuminate substantially a large portion, if not all, of the area of the light guide film. Such a situation is desirable so as to avoid "shadow" or relatively dark areas of a display. Accordingly, light injected into a light guide film that encompasses substantially a large portion, if not all, of the area of the light guide film can allow for a uniformly illuminated display.

Yet another benefit of a foil light coupler is that such a coupler need not include any optical components (e.g., lenses, mirrors and so on) since the coupler utilizes total internal reflection (e.g., similar to an optical fiber or light pipe). Still another benefit is that a foil light coupler can be formed from a thin optical foil, which allows a relatively large number of optical periods compared to the case for thicker optical media. An increased number of optical periods provide a more uniform distribution of light in the light coupler and in a light guide film optically coupled to the light coupler, for example. Of course, such benefits of a foil light coupler are merely a few of a number of examples, and claimed subject matter is not so limited.

Illustrative Environment

FIG. 1 is a perspective view of an environment 100 including a foil light coupler 102 and a light source 104, according to an embodiment. The figure includes mutually orthogonal axes x, y, and z used as reference directions to describe the structure of light coupler 102. In descriptions herein, the x-axis corresponds to a "horizontal" direction and the y-axis corresponds to a "vertical" direction, though such terms are merely relative and not intended to be associated with the downward direction of gravity.

In an implementation, end-face 106 includes end-faces of individual bands 108 of the foil of the light coupler. In particular, a shape includes a plurality of ridges 110 (also see inset figure of a close-up view of a top portion of the light coupler) alternating with a plurality of furrows 112. Sidewalls 114 of an individual furrow 112 can include two bands 108. For example, three furrows 112 and eight corresponding bands are shown in FIG. 1. Of course, a foil light coupler can include any number of furrows, and claimed subject matter is not so limited.

As used herein, a portion of light coupler 102 that includes end-face 106 is called the first distal portion, while a portion that includes the opposite end of light coupler 102 in the z-direction is called the second distal portion. A height 116 of light coupler 102 can vary along the z-direction. Height 116 can be measured as the distance in the y-direction between the top and bottom ridges 110. In an example, height 116 can decrease from the first distal portion to the second distal portion. In other words, height 116 can decrease with increasing z. Height changing in this fashion corresponds to the top ridges converging with the bottom ridges. On the other hand, a width 118 of light coupler 102 can increase from the first distal portion to the second distal portion. In other words, width 118 can increase with increasing z. Width changing in this fashion corresponds to individual bands diverging with respect to one another. In addition to the width 118 of the light coupler increasing from the first distal portion to the second distal portion, distances 128 between adjacent ridges correspondingly increases in the z-direction.

The light source 104, which can include an LED die, for example, is shown in a position to be optically coupled to end-face 106 of the light coupler. In one implementation, an LED chip can be glued to at least a portion of end-face 106. For example, an LED chip can be adhered to the end-face with an index-matching glue. In another example, a clamp or other mechanism can apply a force on an LED chip so as to press the LED chip against the end-face, though claimed subject matter is not limited to any particular technique for holding a light source 104 to end-face 106. In some embodiments, more than one LED chip can be optically coupled to end-face 106 of the light coupler. For example, light source 104 can include a light assembly of two or more LED chips. In such a case, the light assembly can be optically coupled to the end-face 106 so that light from individual LED chips of the assembly is injected into the light coupler. A portion of end-face 106 to which light source 104 is applied can vary from about 25% of the area of the end-face to the entire area of the end-face. Though light source 104 is discussed in example embodiments, a light coupler need not include a light source. For example, in some implementations, a light coupler may be fabricated or provided as a package that includes a light source. In other implementations, a light coupler may be fabricated or provided separately from a light source.

Figure 2:
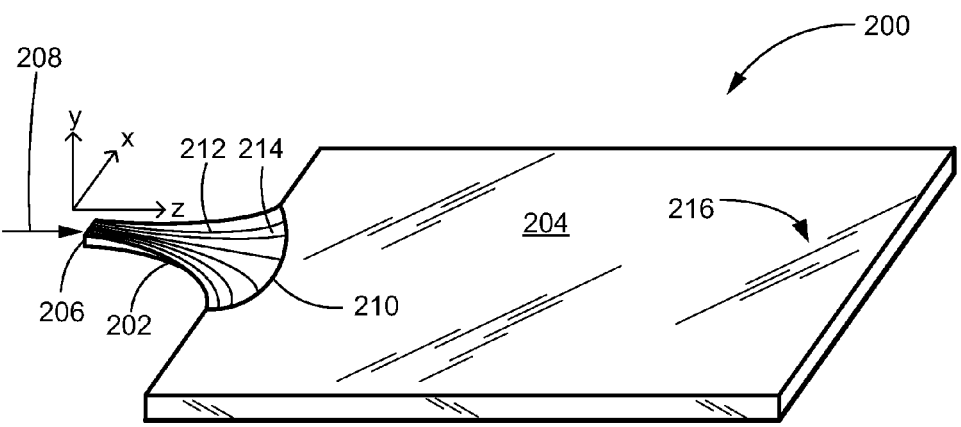
FIG. 2 is a perspective view of an optical device including an optical fan light coupler, according to various embodiments.

FIG. 2 is a perspective view of an optical device 200 including a light coupler 202 and a light guide film 204, according to an embodiment. The figure includes mutually orthogonal axes x, y, and z used as reference directions to describe the structure of light coupler 202 and light guide film 204. In various embodiments, a foil light coupler 202 can be used to efficiently inject light produced by a light source into light guide film 204. Light guide film 204 can have physical dimensions described by a length in the z-direction, a width in the x-direction and a thickness in the y-direction, and terms "length," "width" and "thickness" can be relative terms. For example, a thickness can be at least about 0.25 to at most about 0.50 millimeters, compared to a length and width of many centimeters, though claimed subject matter is not limited in this respect. Such relative dimensions can be implied by the term "film," used herein. Light coupler 202 includes a foil light coupler having a first distal portion 206 to receive light 208. In various embodiments a light source can include an LED, an organic light-emitting diode (OLED), a Quantum dot light-emitting diode (QLED), or an LED die, e.g., LED chip. Light coupler 202 also includes a coupling interface at a second distal portion 210 and a series of ridges 212 and furrows 214. Distance between ridges 212 increases in the z-direction, and thickness of light coupler 202 decreases in the z-direction. In one embodiment, light coupler 202 is optically coupled to light guide film 204 via the coupling interface. Such optical coupling can be implemented by welding or gluing the coupling interface at the second distal portion 210 to an edge region of light guide film 204, as described below.

Light guide film 204 can include any of a number of transparent materials, such as glass, PMMA, PC or other plastic materials. Light coupler 202 includes a transparent foil, such as PMMA, which can be heat-formed into a fan shape.

Any of a number of types of structures or grating patterns 216 can be located on, or included in, at least a portion of light guide film 204. Such structures or grating patterns can be used to out-couple light that light coupler 102 injects into the lightguide film. For example, out-coupled light can be used for back plane or front plane illumination for an LCD display device. In some embodiments, structures or grating patterns 216 can include diffractive features molded, pressed or embossed into the surface of light guide film 204. In other embodiments, diffractive features can include a diffractive coating or film placed onto the surface of light guide film 204 by adhesion, deposition, printing, or the like.

Figure 3A:
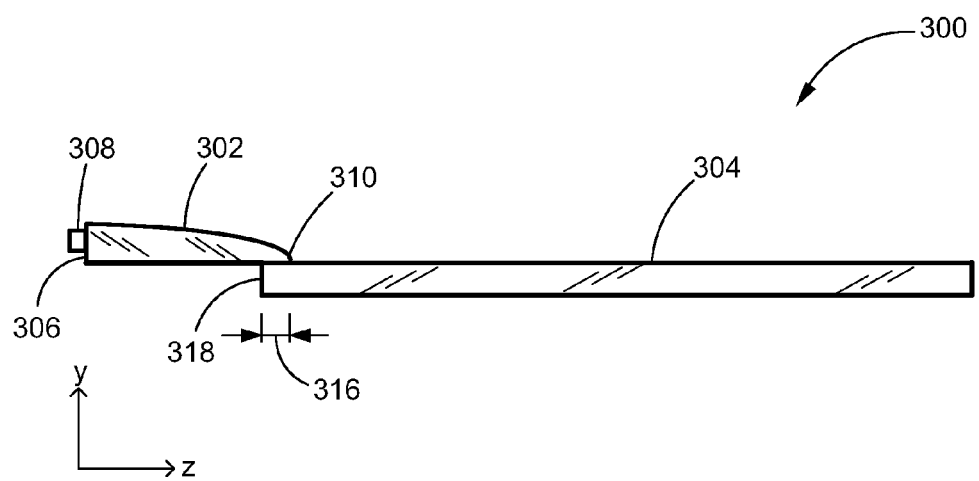
FIG. 3A is a side view of a fan light coupler and a light guide film, according to various embodiments.
Figure 3B:
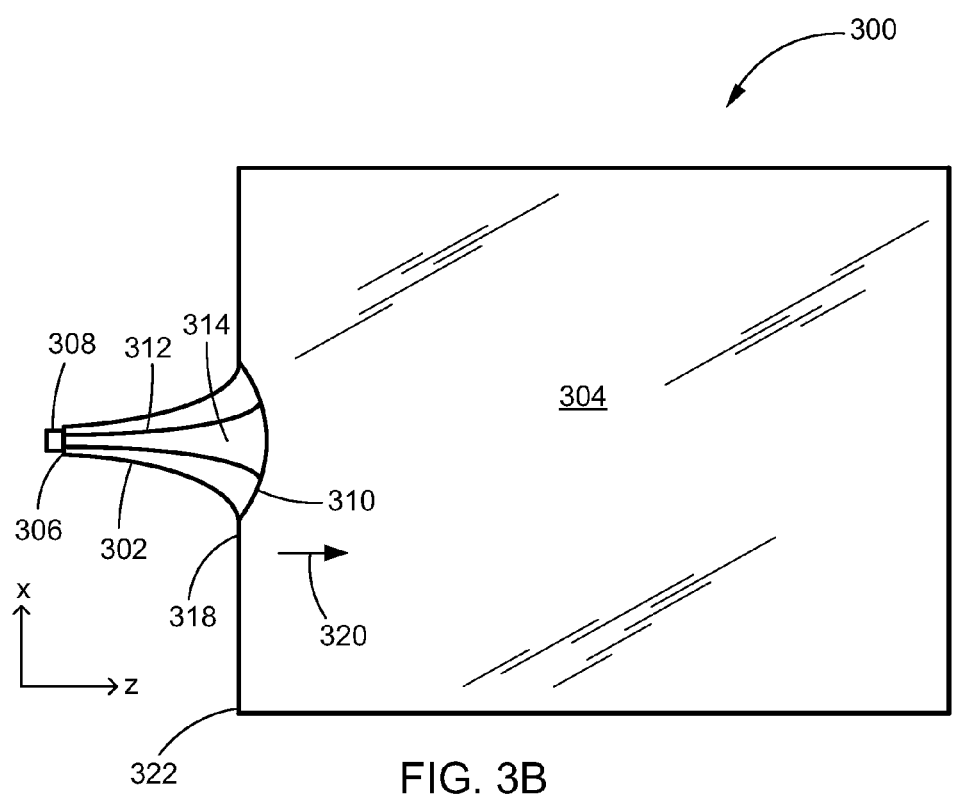
FIG. 3B is a top view of a fan light coupler and a light guide film, as shown in FIG. 3A.

FIG. 3A is a side view of an optical device 300 including a light coupler 302 and a light guide film 304, and FIG. 3B is a top view of the optical device 300. These figures include mutually orthogonal axes x, y, and z used as reference directions to describe the structure of light coupler 302 and light guide film 304. As illustrated, light coupler 302 has a first distal portion 306 to receive light from a light source 308. As described above, one goal of such embodiments is to inject light produced by a light source 308 into light guide film 304. Light coupler 302 accomplishes such a goal by capturing a relatively large portion, if not all, of light produced by source 308, conveying the light via total internal reflection to a second distal portion 310, and injecting the light into the light guide film 304. Corresponding to the decreasing thickness of the light coupler along the z-direction, the light converges in a direction substantially perpendicular (the y-direction) to light guide film 304 as the light travels in the z-direction in light coupler 302. Such converging squeezes the light into the relatively thin edge of light guide film 304. Simultaneously, corresponding to the widening of the light coupler along the z-direction, the light diverges in a direction substantially parallel (the x-direction) with light guide film 304 as the light travels in light coupler 302. Such diverging spreads the light into the plane of the light guide film with a distribution of angles sufficient to provide the light over a relatively large, if not the entire, area of the light guide film.

Light coupler 302 is shown in FIG. 3B to include ridges 312 and furrows 314 corresponding to a shape of the light coupler. Though light coupler 302 is shown to have a particular number of ridges and furrows, a light coupler can include any number of ridges and furrows. Accordingly, light couplers shown in FIGS. 2-12 are merely example representations of a foil light coupler. Vertical dimensions of the individual ridges and furrows decrease in the direction from the first distal portion 306 to the second distal portion 310. On the other hand, horizontal spacing between the individual ridges and furrows increases in a direction from the first distal portion to the second distal portion.

A first distal portion 306 of light coupler 302 includes an end-face to which a light source 308 can be positioned adjacently. For example, an end-face is substantially flat to correspond to light source 308 in the form of an LED die. In another example, an end-face is concave to correspond to light source 308 in the form of an LED that includes a lens. A second distal portion 310 of light coupler 302 includes coupling interface having a shape to correspond to a shape (e.g., substantially flat) of light guide film 304 to which light coupler 302 can be optically coupled, such as by gluing or welding. In one implementation, a region of overlap 316 or contact between the light coupler and the light guide film includes an edge portion of the light guide film. For example, such an edge portion can extend from an end-face 318 into the light guide film, in a direction indicated by arrow 320 by several millimeters or centimeters. Of course, such details of a light guide and light guide film are merely examples, and claimed subject matter is not so limited.

In other implementations, light coupler 302 is optically coupled via contact with at least a portion of end-face 318 and need not include any overlap (e.g., 316). Whether light coupler is optically coupled to end-face 318 of light guide film 304, overlap region 316 (as shown in FIGS. 3A and 3B, for example), or both can depend, at least in part, on consideration of angles of total internal reflection of light that travels in the light coupler to the light guide film. For example, angles of light rays exiting second distal portion 310 of light coupler 302 and entering light guide film 304 can fall within a range that results in a more desirable distribution of light in the light guide film for one optical coupling position versus another. In yet other implementations, light coupler 302 can be optically coupled via contact with at least a portion of end-face 318 at or near a central region of end-face 318 (e.g., as shown in FIG. 3B) or at or near a corner 322, for example.

Optically coupling a light coupler to a light guide film involves any of a number of techniques, such as welding, gluing or placing an index matching material (e.g., a gel or liquid) between the light coupler and the light guide film, which can be merely held mutually in position by clamping, just to name a few examples. Increasing an area of contact between light coupler 302 and light guide film 304 can simplify a process of optically welding the light coupler to the light guide film.

In some implementations, light source 308 includes an LED die that can be optically coupled to an end-face of first distal portion 306 of the light coupler. The LED die can be glued to at least a portion of the end-face. Alternatively, the LED die can be held against the end-face with a clamp or other mechanism. Figures herein show these implementations. In other implementations, however, the light source may be located remotely from the light coupler. In this case, light from the remote light source is conveyed to the end-face of the light coupler via an optical fiber (or fiber bundle) or other optically transmissive component (not shown).

Figure 4A:
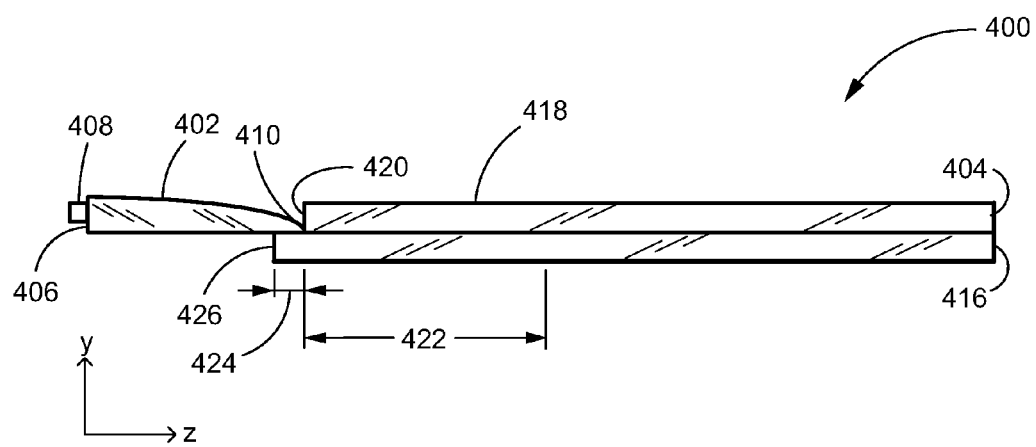
FIG. 4A is a side view of a fan light coupler and a light guide film, according to several embodiments.
Figure 4B:
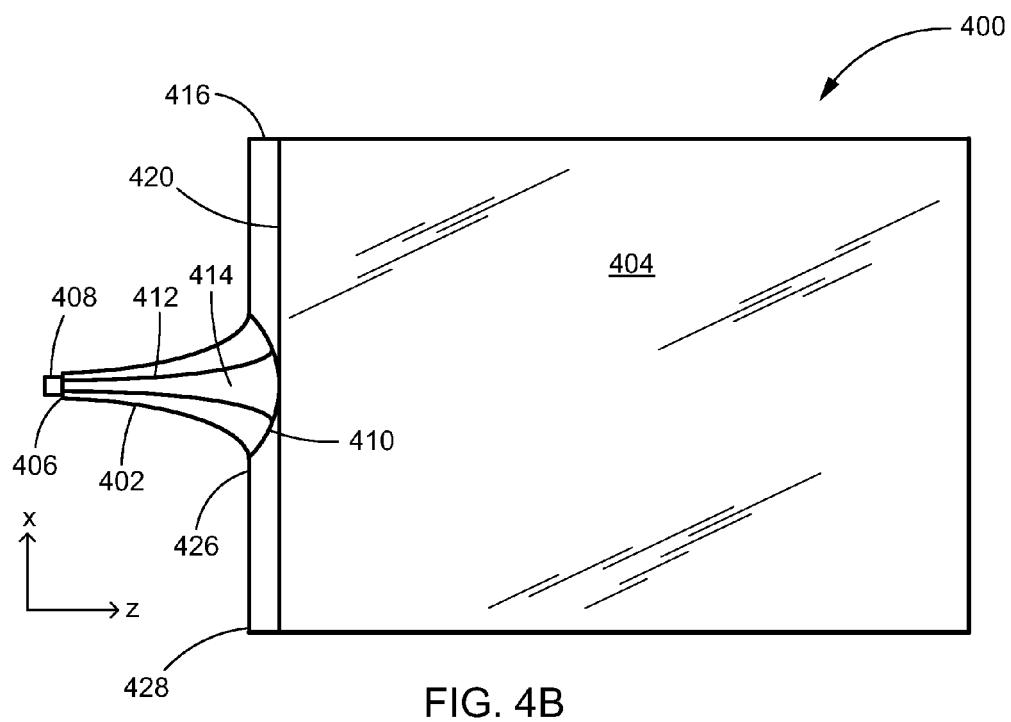
FIG. 4B is a top view of a fan light coupler and a light guide film, as shown in FIG. 4A.

FIG. 4A is a side view of an optical device 400 including a light coupler 402 and a light guide film 404, and FIG. 4B is a top view of the optical device 400. These figures include mutually orthogonal axes x, y, and z used as reference directions to describe the structure of light coupler 402 and light guide film 404. As illustrated, light coupler 402 has a first distal portion 406 to receive light from a light source 408. Light coupler 402 conveys light, such as via total internal reflection to a second distal portion 410. This embodiment includes a number of aspects similar to those described above regarding optical device 300. Again, similar to that described above, a goal of such an embodiment is to inject light produced by a light source 408 into light guide film 404. Light coupler 402 is shown in FIG. 4B to include ridges 412 and furrows 414 corresponding to a shape of the light coupler. Though light coupler 402 is shown to have a particular number of ridges and furrows, a light coupler can include any number of ridges and furrows. Optical device 400 includes a coupling film 416 laminated to light guide film 404.

Light coupler 402 injects light into coupling film 416, which then injects light into the bottom surface of light guide film 404. In some implementations, the top surface of light guide film 404 includes a pattern 418 to distribute light for illuminating an LCD display. In various embodiments light guide film 404 and coupling film 416 are laminated together by a heating or gluing process.

In at least one implementation, light coupler 402 and coupling film 416 represent a single, integral structure. For example, light coupler 402 and coupling film 416 can be fabricated as a single structure. A similar implementation is described below for a light coupler and light guide film fabricated as a single part, shown in FIGS. 5A and 5B. In at least one other implementation, light coupler 402 and coupling film 416 can represent two separate structures that are assembled together to be optically coupled to one another by welding, gluing or placing an index matching material (e.g., a gel or liquid) between the light coupler and the coupling film.

Compared to optical device 300, a light coupler 402 optically coupled to a coupling film 416 more efficiently injects light into a light guide film 404. One reason for this increased efficiency is that an optical contact area between coupling film 416 and light guide film 404 is much greater than an optical contact area between a second distal portion 410 of the light coupler and an end-face 420 of the light guide film. Accordingly, a light coupler that includes a coupling film 416 can inject light into a light guide film uniformly over a larger area as compared to the case of optical device 300, for example. Coupling film 416 can extend any distance 422 along light guide film 404 (e.g., in the z-direction), in a range from a few millimeters to a full length of the light guide film, for example. In some implementations, coupling film 416 can be about 0.05 millimeters thick, though any thickness can be used and claimed subject matter is not so limited.

Similar to optical device 300, a first distal portion 406 of light coupler 402 includes an end-face to which a light source 408 can be positioned adjacently. Second distal portion 410 of light coupler 402 includes a shape to correspond to a shape (e.g., substantially flat) of coupling film 416 to which light coupler 402 can be optically coupled, such as by gluing or welding, for example. In one implementation, however, and as mentioned above, coupling film 416 and light coupler 402 represent a single part, having been fabricated as such. A region of contact between the light coupler and the coupling film includes an edge portion of the coupling film, which also corresponds to a displacement 424 of an end-face 420 of light guide film relative to an edge 426 of coupling film 416, for example. Of course, such details of a light guide and light guide film are merely examples, and claimed subject matter is not so limited.

In other implementations, light coupler 402 is optically coupled to coupling film 416 via contact with at least a portion of edge 426. Whether light coupler 402 is optically coupled to edge 426 of coupling film 416, a region of displacement 424, or both can depend, at least in part, on consideration of angles of total internal reflection of light that travels in the light coupler to the coupling film. Depending, at least in part, on how light coupler 402 is optically coupled to coupling film 416, angles of light rays exiting second distal portion 410 of light coupler 402 and entering coupling film 416 can fall within a range of values that results in a desirable distribution of light in the light guide film. In yet other implementations, light coupler 402 is optically coupled via contact with at least a portion of edge 426 at or near a central region of edge 426 (e.g., as shown in FIG. 4B) or at or near a corner 428, for example.

Optically coupling light coupler 402 to coupling film 416 can involve any of a number of techniques, such as welding, gluing, or placing an index matching material (e.g., a gel or liquid) between the light coupler and the coupling film, which can be merely held mutually in position by clamping, just to name a few examples. In some implementations, however, a coupling film and a light coupler represent a single part, having been fabricated as such, as described below.

Figure 5A:
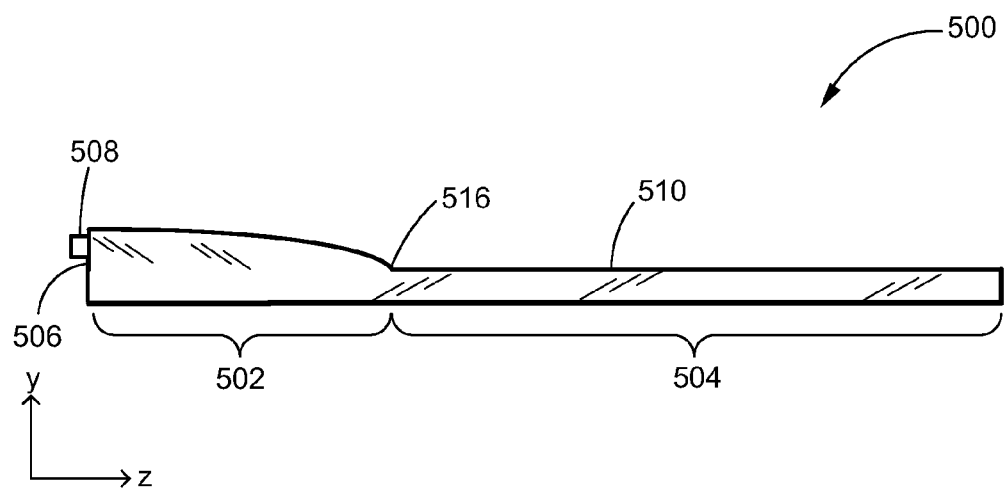
FIG. 5A is a side view of a fan light coupler and a light guide film, according to some embodiments.
Figure 5B:
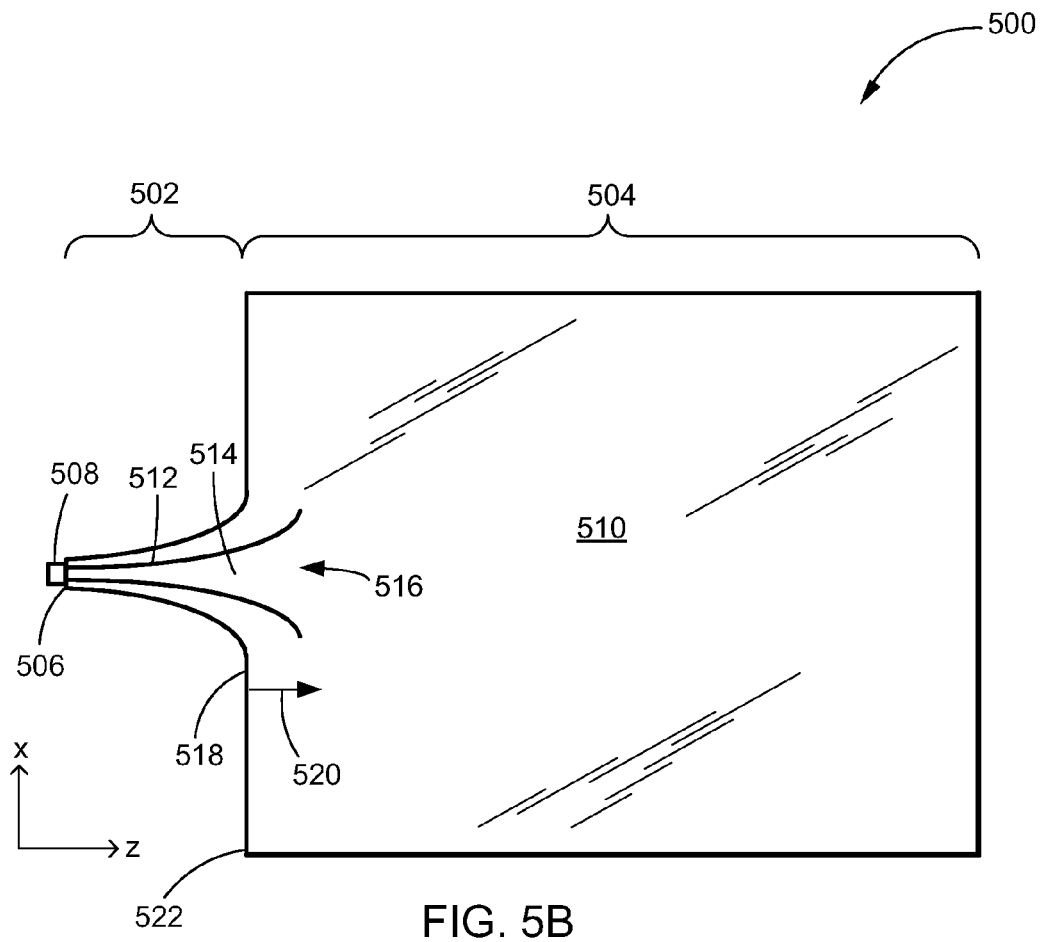
FIG. 5B is a top view of a fan light coupler and a light guide film, as shown in FIG. 5A.

FIG. 5A is a side view of an optical device 500 including a light coupler portion 502 and a light guide film portion 504, and FIG. 5B is a top view of the optical device 500. These figures include mutually orthogonal axes x, y, and z used as reference directions to describe the structure of light coupler portion 502 and light guide film portion 504. As illustrated, light coupler portion 502 has a first distal portion 506 to receive light from a light source 508.

Unlike embodiments described above where a light coupler and a light guide film represent separate components that are optically coupled, a light guide 510 represents a single part including light coupler portion 502 and light guide film portion 504. For example, light coupler portion 502 and light guide film portion 504 can be fabricated as a single part, by a heat forming process or by a molding process.

Light coupler portion 502 of light guide 510 is shown in FIG. 5B to include ridges 512 and furrows 514 corresponding to a shape of the light coupler portion 502. Though light coupler portion 502 is shown to have a particular number of ridges and furrows, a light coupler portion 502 can include any number of ridges and furrows. A first distal portion 506 of light coupler portion 502 includes an end-face to which a light source 508 can be positioned adjacently. Such an end-face can be flat or concave. As mentioned above, light source 508 can include an LED, OLED, QLED, or LED die. A second distal portion 516 of light coupler portion 502 of light guide 510 includes a region where the fan shape of the light coupler portion 502 transitions to a flat shape corresponding to light guide film portion 504 of light guide 510. A region of such a shape transition can be measured from an edge 518 as a distance 520 to where ridges 512 and furrows 514 of light coupler portion 502 substantially terminate (or are no longer discernible). Distance 520 can range from several millimeters to more than half the length of the light guide film portion 504 of light guide 510. A region and/or shape of the transition from the corrugation of the light coupler portion 502 to the flat shape of the light guide film portion 504 affects the angular distribution of light entering the light guide film portion 504 from the light coupler portion 502. Of course, such details of a light guide and light guide film are merely examples, and claimed subject matter is not so limited.

In some implementations, light coupler portion 502 of light guide 510 is located at or near a central region of edge 518 (e.g., as shown in FIG. 5B). In other implementations, light coupler 502 of light guide 510 is located at or near a corner 522.

Figure 6A:
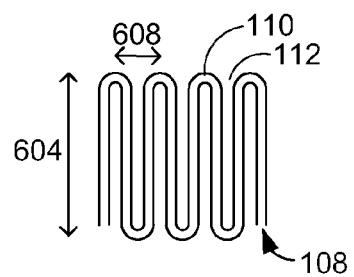
FIG. 6A is a schematic diagram illustrating a shape of the end-face of the fan light coupler illustrated in FIG. 1, according to various embodiments.
Figure 6B:
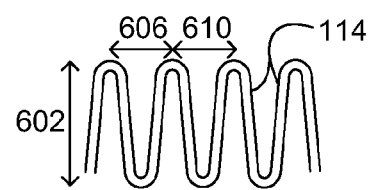
FIG. 6B is a schematic diagram illustrating a shape of a cross-section of the fan light coupler illustrated in FIG. 1, according to various embodiments.

FIG. 6A is a schematic diagram illustrating a shape of the end-face of the fan light coupler illustrated in FIG. 1, and FIG. 6B is a schematic diagram illustrating a shape of a cross-section C-C' of the fan light coupler, according to various embodiments. FIGS. 6A and 6B demonstrate how comparative height and comparative width of light coupler 102 changes from the first distal portion to the second distal portion. FIG. 6A shows a cross-section of light coupler 102 in the first distal portion. For example, this cross-section may be the same as end-face 106 or may be close to the end-face. FIG. 6B shows a cross-section C-C' of light coupler 102 closer to the second distal portion. Labels in FIG. 1 for bands 108, ridges 110, furrows 112 and sidewalls 114 are repeated in FIGS. 6A and 6B.

At cross-section C-C', a height 602 of the light coupler can be less than height 604 of the light coupler at or near end-face 106. This change in height corresponds to the height of the light coupler decreasing in a direction from the first distal portion to the second distal portion. Regarding the width of light coupler 102, at cross-section C-C' distances 606 between adjacent ridges (horizontal spacing) can be less than distances 608 at or near end-face 106. This change in distances between adjacent ridges corresponds to the width of the light coupler increasing in a direction from the first distal portion to the second distal portion. FIG. 1 includes another view showing distances 128 between adjacent ridges increasing in the z-direction.

In some embodiments, a shape of light coupler 102 can be described in terms of mathematical functions or parameters. For example, cross-sections of a light coupler, such as shown in FIGS. 6A and 6B, can have shapes that can be described using parameters similar to those used to describe a sinusoid. Such parameters for a sinusoid are wavelength and peak-to-peak amplitude. Accordingly, for a cross-section of the light coupler, wavelength can correspond to a distance between ridges (horizontal spacing) and peak-to-peak amplitude can correspond to a height (vertical dimension) as measured between top and bottom ridges. In terms of such a description scheme, cross-sectional wavelengths of light coupler 102 increase in the z-direction, while cross-sectional amplitudes of the light coupler decrease in the z-direction. For example, the cross-sectional "wavelength" of the light coupler increases from a value 608 at end-face 106 to a value 606 at cross-section C-C'. Also, the cross-sectional "amplitude" of the light coupler decreases from a value 604 at end-face 106 to a value 602 at cross-section C-C'. Of course, these descriptions are not intended to be rigorous, and such cross-sectional shapes need not correspond to a sinusoid or other regular, cyclic wave function. Moreover, distances between adjacent ridges and heights of ridges may vary in the same cross-section. For example, distances 606 and 610 need not be the same.

Figure 7:
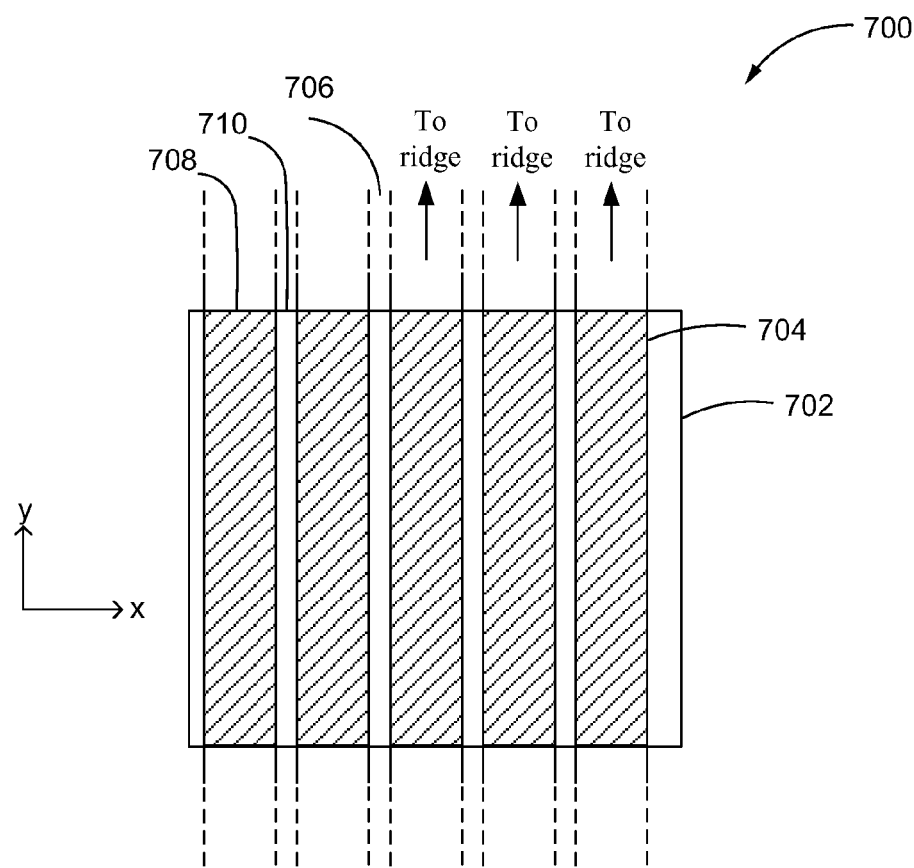
FIG. 7 is a schematic diagram illustrating comparison of an end-face area of a fan light coupler and an area of a light source, according to some embodiments.

FIG. 7 is a schematic diagram illustrating a comparison of end-face area 700 of a light coupler and area of a light source 702, according to some embodiments. This figure includes mutually orthogonal axes x and y used as reference directions to describe the structure of the light coupler. For example, a light source 702 can include an LED die. In FIG. 7, a number of bands 704 of an end-face of a light coupler are shown to cross surface area of a light source 702. For example, individual bands 704 can lead to ridges of a shape of the light coupler. Such ridges alternate with furrows 706, as explained above.

To capture a substantial portion of light emitted by a light source having an area 702, it is desirable to increase the amount of surface area of bands 704 optically coupled to the light source. Shaded areas 708 represent such a surface area. Non-shaded areas 710 represent areas of the light source that are not coupled to any portion of an end-face of light coupler. For example, for a homogeneous distribution of emitted light across the surface area of the light source 702, a light coupling ratio comprising the area 708 to the total area of the light source 702 can indicate an efficiency of capturing light into the light coupler. For example, if area 708 comprises 90% of the total area of the light source 702, then light capturing efficiency can be 90%. Accordingly, if bands 704 are "squeezed" closer together to reduce an area 710, then light capturing efficiency can increase. However, compressing bands so as to be closer together can correspond to ridges, such as ridges 110 as illustrated in FIG. 1, having a reduced radius of curvature, which can be undesirable for light transmission based on total internal reflection, as in the case for a film light coupler 602. An embodiment shown in FIG. 8 includes bands that are relatively close together at or near light source 804 while maintaining ridges having a desirably large radius of curvature.

Figure 8A:
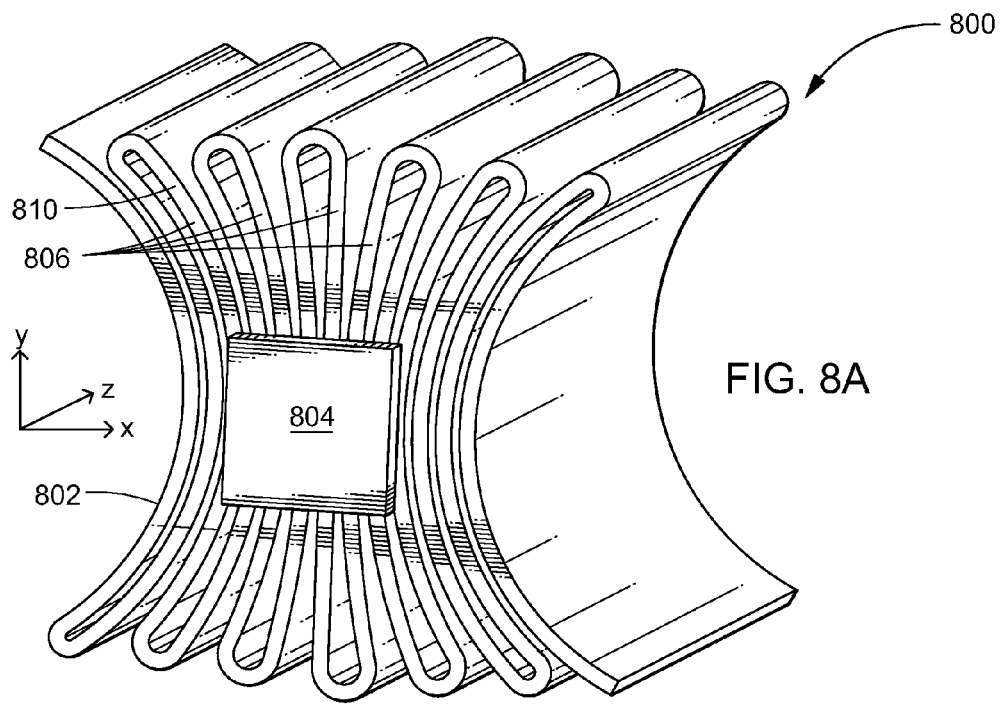
FIG. 8A is a perspective view of a fan light coupler and a light source, according to various embodiments.
Figure 8B:
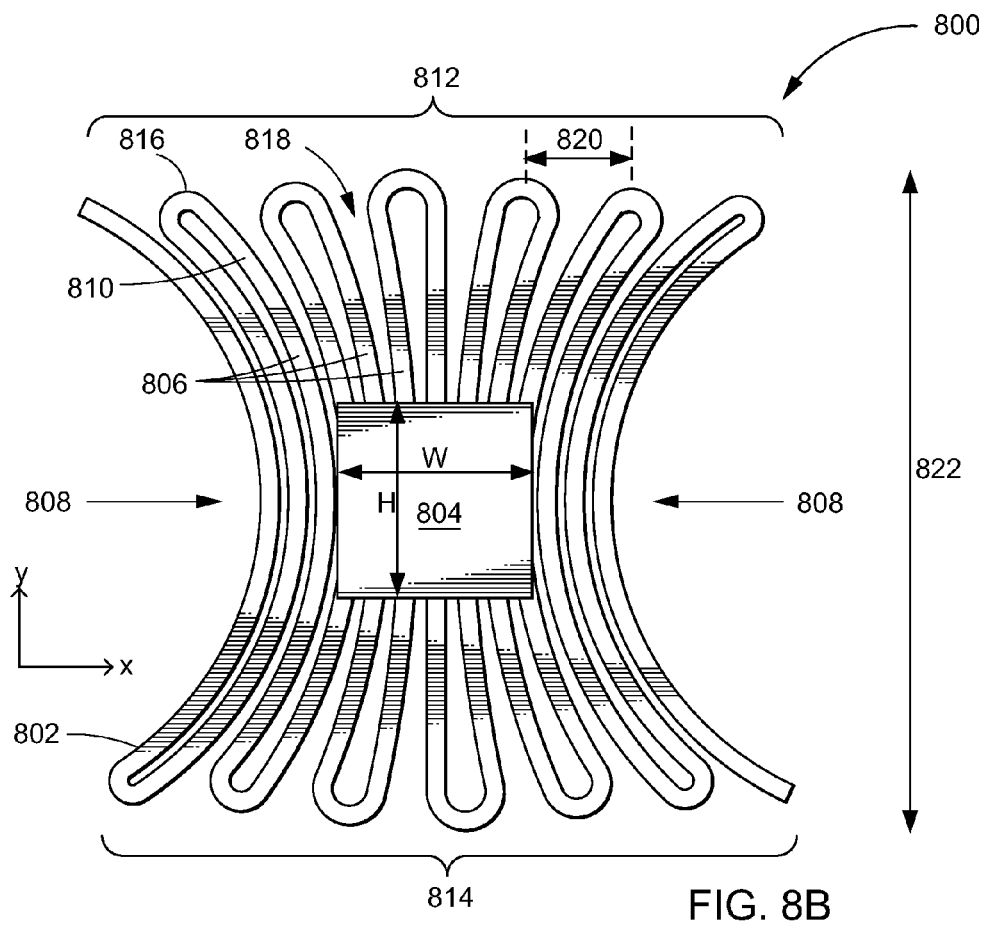
FIG. 8B is a front view of a fan light coupler and a light source, as shown in FIG. 8A.

FIG. 8A is a perspective view of an environment 800 including a first distal portion of a light coupler 802 and a light source 804, and FIG. 8B is a front view of the end-face of the light coupler 802 and the light source 804. FIG. 8A and FIG. 8B include mutually orthogonal axes x, y, and z used as reference directions to describe the structure of light coupler 802 and light source 804. Light source 804 can include an LED die having horizontal and vertical dimensions ranging from about 0.1 millimeters to about 1.0 millimeters. As mentioned above, if bands 806 are "squeezed" closer together in the x-direction to increase an area of the bands that are optically coupled with light source 804, then light capturing efficiency increases. Accordingly, light coupler 802 can include a waist 808 comprising a region near end-face 810 that is narrower in the x-direction at the light source 804 than at an upper portion 812 or lower portion 814 of light coupler 802. In other words, a horizontal (in the x-direction) spacing between individual ridges and furrows at the end-face decreases in the y-direction from the top of the light coupler 802 to waste 808, where light source 804 can reside. Similarly, the horizontal spacing between individual ridges and furrows at the end-face also decreases in the y-direction from the bottom of the light coupler 802 to waste 808. For example, waist 808 of light coupler 802 at end-face 810 can range from about 1.0 to about 2.0 times the horizontal dimension W of light source 804. The extent of such a waist can diminish in the z-direction toward a second distal portion (e.g., an end of the light coupler that can be optically coupled to a light guide film or coupling film). The relatively narrow waist 808 at end-face 810 can increase the number of bands optically coupled to light source 804 while the wider upper and lower portions can allow for ridges 816 (which alternate with furrows 818) having relatively large radius of curvature values, which can be desirable for total internal reflection of the light coupler. Radius of curvature depends, at least in part, on an index of refraction of light coupler 802 and thicknesses of bands 806. For example, for efficient light transmission that is greater than about 80%, radius of curvature values can be as low as about half the thickness of individual bands 806. Above such values, small increase in radii can improve transmission efficiency. In some embodiments, the thickness of individual bands 806 can be about 0.1 millimeter. Spacing 820 can range from about 2.0 to about 10.0 times the thickness of individual bands 806. A vertical height 822 of light coupler 802 at end-face 810 can range from about 1.0 to about 4.0 times the vertical dimension H of light source 804.

Figure 9:
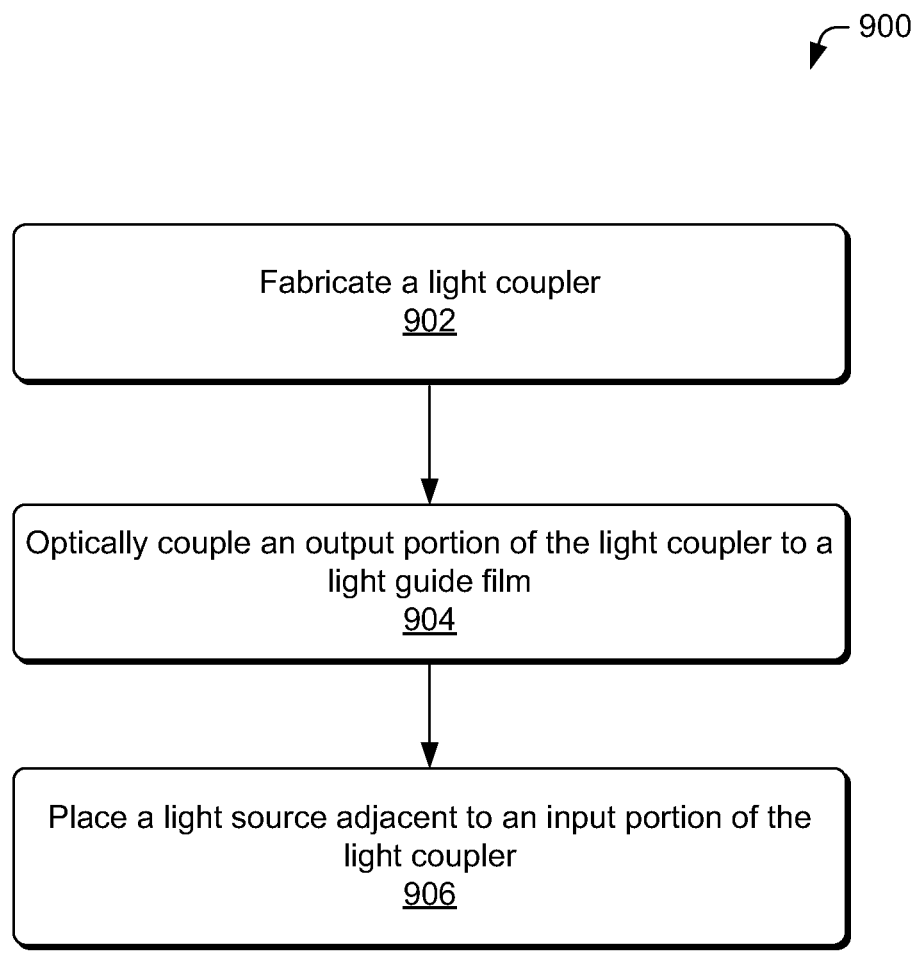
FIG. 9 is a flow diagram of a process for assembling an optical device including a fan light coupler, a light guide film and a light source, according to a variety of embodiments.

FIG. 9 is a flow diagram of a process 900 for assembling a light source and a light guide film, according to various embodiments. The example process is described in the context of FIGS. 2-8 but is not limited to those contexts. The order in which the operations are described in the example method is not intended to be construed as a limitation, and any number of the described blocks can be combined in any order and/or in parallel to implement the method.

At block 902, a light coupler can be fabricated. For example, a light coupler comprising a transparent foil including a series of ridges and furrows that diverge in a first direction and converge in a second direction substantially perpendicular to the first direction can be fabricated. Some techniques for fabrication can include injection molding, extrusion, or thermoforming, just to name a few examples. In one implementation, thermoforming can comprise a manufacturing process where a transparent plastic sheet or film can be heated to a pliable forming temperature, formed to a particular shape in a mold, and trimmed to create a light coupler or a portion thereof. The sheet or film can be heated in an oven to a high-enough temperature so that the sheet or film can be stretched into or onto a mold and cooled to a finished shape, for example.

At block 904, an output portion of the light coupler can be optically coupled to a light guide film, using a welding technique, gluing, or compression in conjunction with an index matching fluid or gel, just to name a few examples. At block 906, a light source is placed adjacent to an input portion of the light coupler. Alternatively, a light source can be located remotely from the light coupler. Light from the light source is then provided to the input portion of the light coupler via an optical pipe (e.g., optical fiber, fiber bundle or transmissive optical block). As a consequence, the light coupler can be injected with light that is transmitted to the light guide film. Of course, process 900 is merely an example, and claimed subject matter is not so limited.

Figure 10:
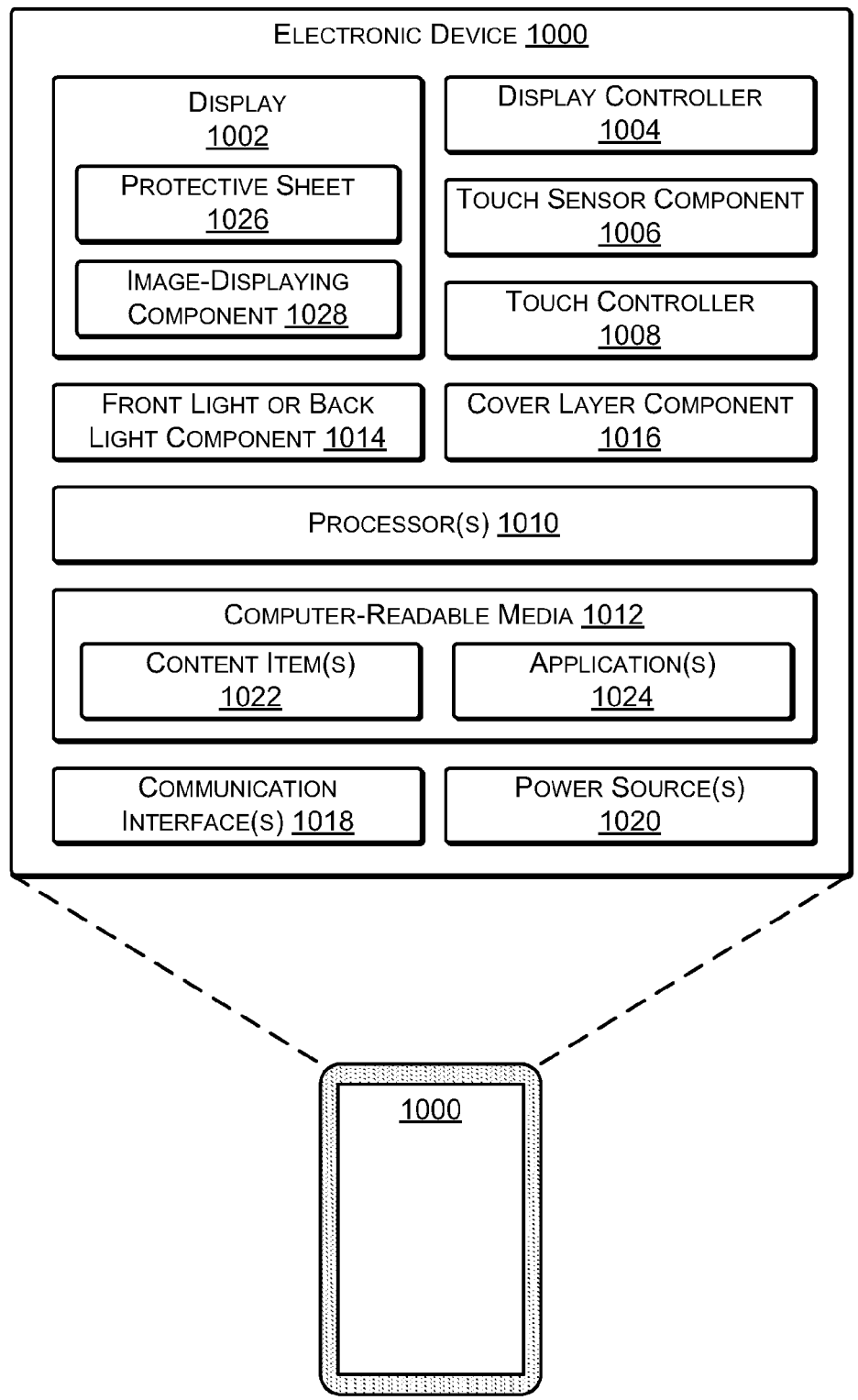
FIG. 10 illustrates an example electronic device equipped with a light guide, according to some embodiments.

FIG. 10 illustrates an example electronic device 1000 that may include the example light guide films and light couplers used in display assemblies discussed above. The device 1000 may comprise any type of electronic device having a display. For instance, the device 1000 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1000 may be a non-mobile electronic device (e.g., a computer display, a television, etc.). In addition, while FIG. 10 illustrates several example components of the electronic device 1000, it is to be appreciated that the device 1000 may also include other conventional components, such as an operating system, system busses, input/output components, and the like. Further, in other examples, such as in the case of a television or computer monitor, the electronic device 1000 may only include a subset of the components shown.

Regardless of the specific implementation of the electronic device 1000, the device 1000 includes a display 1002 and a corresponding display controller 1004. The display 1002 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 1002 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1000, the display 1002 may be an active display such as a liquid crystal display, a plasma display, a light emitting diode display, an organic light emitting diode display, and so forth. Accordingly, implementations herein are not limited to any particular display technology.

In one implementation, the display 1002 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 1002 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller 1004 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1002 may represent a backlit display, examples of which are mentioned above.

In addition to including the display 1002, FIG. 10 illustrates that some examples of the device 1000 may include a touch sensor component 1006 and a touch controller 1008. In some instances, at least one touch sensor component 1006 resides with, or is stacked on, the display 1002 to form a touch-sensitive display (e.g., an electronic paper touch-sensitive display). Thus, the display 1002 may be capable of both accepting user touch input and rendering content in response to or corresponding to the touch input. As several examples, the touch sensor component 1006 may comprise a capacitive touch sensor, a force sensitive resistance (FSR), an interpolating force sensitive resistance (IFSR) sensor, or any other type of touch sensor. In some instances, the touch sensor component 1006 is capable of detecting touches as well as determining an amount of pressure or force of these touches.

FIG. 10 further illustrates that the electronic device 1000 may include one or more processors 1010 and one or more computer-readable media 1012, as well as a front light component 1014 (which may alternatively be a backlight component in the case of a backlit display) for lighting the display 1002, a cover layer component 1016, such as a cover glass or cover sheet, one or more communication interfaces 1018 and one or more power sources 1020. The communication interfaces 1018 may support both wired and wireless connection to various networks, such as cellular networks, radio, WiFi networks, short range networks (e.g., Bluetooth®), infrared (IR), and so forth.

Depending on the configuration of the electronic device 1000, the computer-readable media 1012 (and other computer-readable media described throughout) is an example of computer storage media and may include volatile and nonvolatile memory. Thus, the computer-readable media 1012 may include, but is not limited to, RAM, ROM, EEPROM, flash memory, or other memory technology, or any other medium that can be used to store computer-readable instructions, programs, applications, media items, and/or data which can be accessed by the electronic device 1000.

The computer-readable media 1012 may be used to store any number of functional components that are executable on the processor 1010, as well as content items 1022 and applications 1024. Thus, the computer-readable media 1012 may include an operating system and a storage database to store one or more content items 1022, such as eBooks, audio books, songs, videos, still images, and the like. The computer-readable media 1012 of the electronic device 1000 may also store one or more content presentation applications to render content items on the device 1000. These content presentation applications may be implemented as various applications 1024 depending upon the content items 1022. For instance, the content presentation application may be an electronic book reader application for rending textual electronic books, an audio player for playing audio books or songs, a video player for playing video, and so forth.

In some instances, the electronic device 1000 may couple to a cover (not shown in FIG. 10) to protect the display (and other components in the display stack or display assembly) of the device 1000. In one example, the cover may include a back flap that covers a back portion of the device 1000 and a front flap that covers the display 1002 and the other components in the stack. The device 1000 and/or the cover may include a sensor (e.g., a hall effect sensor) to detect when the cover is open (i.e., when the front flap is not atop the display and other components). The sensor may send a signal to the front light component 1014 when the cover is open and, in response, the front light component 1014 may illuminate the display 1002. When the cover is closed, meanwhile, the front light component 1014 may receive a signal indicating that the cover has closed and, in response, the front light component 1014 may turn off.

Furthermore, the amount of light emitted by the front light component 1014 may vary. For instance, upon a user opening the cover, the light from the front light may gradually increase to its full illumination. In some instances, the device 1000 includes an ambient light sensor (not shown in FIG. 10) and the amount of illumination of the front light component 1014 may be based at least in part on the amount of ambient light detected by the ambient light sensor. For example, the front light component 1014 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1002 may vary depending on whether the front light component 1014 is on or off, or based on the amount of light provided by the front light component 1014. For instance, the electronic device 1000 may implement a larger default font or a greater contrast when the light is off compared to when the light is on. In some instances, the electronic device 1000 maintains, when the light is on, a contrast ratio for the display that is within a certain defined percentage of the contrast ratio when the light is off.

As described above, the touch sensor component 1006 may comprise a capacitive touch sensor that resides atop the display 1002. In some examples, the touch sensor component 1006 may be formed on or integrated with the cover layer component 1016. In other examples, the touch sensor component 1006 may be a separate component in the stack of the display assembly. The front light component 1014 may reside atop or below the touch sensor component 1006. In some instances, either the touch sensor component 1006 or the front light component 1014 is coupled to a top surface of a protective sheet 1026 of the display 1002. As one example, the front light component 1014 may include a lightguide sheet and a light source (not shown in FIG. 10). The lightguide sheet may comprise a substrate (e.g., a transparent thermoplastic such as PMMA or other acrylic), a layer of lacquer and multiple grating elements formed in the layer of lacquer that function to propagate light from the light source towards the display 1002, thus illuminating the display 1002.

The cover layer component 1016 may include a transparent substrate or sheet having an outer layer that functions to reduce at least one of glare or reflection of ambient light incident on the electronic device 1000. In some instances, the cover layer component 1016 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, the protective sheet 1026 may include a similar UV-cured hard coating on the outer surface. The cover layer component 1016 may couple to another component or to the protective sheet 1026 of the display 1002. The cover layer component 1016 may, in some instances, also include a UV filter, a UV-absorbing dye, or the like, for protecting components lower in the stack from UV light incident on the electronic device 1000. In still other examples, the cover layer component 1016 may include a sheet of high-strength glass having an antiglare and/or antireflective coating.

The display 1002 includes the protective sheet 1026 overlying an image-displaying component 1028. For example, the display 1002 may be preassembled to have the protective sheet 1026 as an outer surface on the upper or image-viewing side of the display 1002. Accordingly, the protective sheet 1026 may be integral with and may overlie the image-displaying component 1028. The protective sheet 1026 may be optically transparent to enable a user to view, through the protective sheet 1026, an image presented on the image-displaying component 1028 of the display 1002.

In some examples, the protective sheet 1026 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1026 may include a coating, such as the hard coating described above. For instance, the hard coating may be applied to the outer surface of the protective sheet 1026 before or after assembly of the protective sheet 1026 with the image-displaying component 1028 of the display 1002. In some examples, the hard coating may include a photoinitiator or other reactive species in its composition, such as for curing the hard coating on the protective sheet 1026. Furthermore, in some examples, the protective sheet 1026 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1026, thereby protecting the image-displaying component 1028 from UV light.

According to some implementations herein, one or more of the components discussed above may be coupled to the display 1002 using a liquid optically clear adhesive (LOCA). For example, suppose that the light guide portion of the front light component 1014 is to be coupled to the display 1002. The light guide may be coupled to the display 1002 by placing the LOCA on the outer or upper surface of the protective sheet 1026. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1014 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1014. In other implementations, the LOCA may be placed near a center of the protective sheet 1026, and pressed outwards towards a perimeter of the top surface of the protective sheet 1026 by placing the front light component 1014 on top of the LOCA. The LOCA may then be cured by directing UV light through the front light component 1014. As discussed above, and as discussed additionally below, various techniques, such as surface treatment of the protective sheet, may be used to prevent discoloration of the LOCA and/or the protective sheet 1026.

While FIG. 10 illustrates a few example components, the electronic device 1000 may have additional features or functionality. For example, the device 1000 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 1000 may reside remotely from the device 1000 in some implementations. In these implementations, the device 1000 may utilize the communication interfaces 1018 to communicate with and utilize this functionality.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A device comprising:
   a source of light;
   a corrugated foil having a fan shape including a series of ridges, wherein:
      individual ridges of the series of ridges comprise a folded portion of the corrugated foil;
      the corrugated foil extends from a first distal portion to a second distal portion;
      the first distal portion includes an end-face of the corrugated foil to receive light from the source of light;
      the second distal portion includes a coupling interface of the corrugated foil to emit light received from the light source and transmitted through the corrugated foil;
      horizontal spacing between individual ridges of the series of ridges increases in a direction from the first distal portion to the second distal portion; and
      vertical dimensions of the individual ridges decrease in the direction from the first distal portion to the second distal portion; and
   a planar coupling film optically coupled to the coupling interface to transmit the light emitted from the coupling interface to a light guide film, wherein the light guide film is incorporated in a display device for backlight or frontlight illumination.

2. A device as claim 1 recites, incorporated in a display device wherein the light source comprises a light emitting diode (LED) die optically coupled to the end-face of the corrugated foil.

3. A device as claim 1 recites, wherein the horizontal spacing between the individual ridges at the end-face is less at a center portion of the end-face than at a top of the ridges at the end-face.

4. A corrugated optical foil comprising:
a first distal portion including an end-face of the corrugated optical foil to receive light; and
a second distal portion extending from the first distal portion in a fan shape that includes a series of ridges that include portions of the corrugated optical foil having a folded shape, wherein:
received light travels in the corrugated optical foil via total internal reflection to the second distal portion of the corrugated optical foil; and
the series of ridges diverges in a direction from the first distal portion to the second distal portion; and
a planar coupling film optically coupled to the second distal portion to transmit light emitted from the second distal portion to a light guide film, wherein the light guide film is incorporated in a display device for backlight or frontlight illumination.

5. A corrugated optical foil as claim 4 recites, wherein vertical dimensions of individual ridges of the series of ridges decrease in the direction from the first distal portion to the second distal portion.

6. A device comprising the corrugated optical foil as claim 4 recites, and further comprising a planar coupling film optically coupled to the second distal portion to transmit light emitted from the second distal portion to a light guide film.

7. A device as claim 6 recites, wherein the planar coupling film is optically coupled to the second distal portion by a weld between the second distal portion and an edge portion of the planar coupling film.

8. A device comprising the corrugated optical foil as claim 4 recites, wherein the corrugated optical foil is incorporated in a display for backlight or frontlight illumination of the display, and the device further comprises a processor to control light transmission into the light guide film for the backlight or frontlight illumination of the display.

9. A device comprising the corrugated optical foil as claim 4 recites, further comprising a light source that is optically coupled to the end-face of the corrugated optical foil.

10. A device as claim 9 recites, wherein the light source comprises a light emitting diode (LED) die.

11. A device as claim 9 recites, wherein horizontal spacing between individual ridges of the series of ridges at the end-face decreases in a direction from a top of the corrugated optical foil to the light source and in a direction from a bottom of the corrugated optical foil to the light source.

12. A device as claim 9 recites, wherein the corrugated optical foil and the light source are incorporated in a display device.

13. A method comprising:
receiving light into a first distal portion of a corrugated foil having a fan shape that includes a series of ridges having a first height at the first distal portion and a second height at a second distal portion, the first height being greater than that second height, wherein individual ridges of the series of ridges comprise a folded portion of the corrugated foil;
transmitting the light from the first distal portion of the corrugated foil to the second distal portion of the corrugated foil along the series of ridges;
transmitting the light from the second distal portion to a planar coupling film that is optically coupled to a light guide film incorporated in a display device for backlight or frontlight illumination; and
causing divergence of the light during the transmitting the light along the series of ridges, wherein the divergence of the light is based, at least in part, on horizontal spacing between individual ridges of the series of ridges increasing in a direction of travel of the light being transmitted from the first distal portion to the second distal portion.

14. A method as claim 13 recites, further comprising converging the light in a direction substantially perpendicular to a direction of travel of the transmitting light from the first distal portion to the second distal portion, the converging being based, at least in part, on vertical dimensions of the individual ridges of the series of ridges decreasing in the direction of travel of the light being transmitted from the first distal portion to the second distal portion.

15. A method as claim 13 recites, further comprising transmitting the light from the second distal portion to a light guide film incorporated in a display device for backlight or frontlight illumination, wherein the second distal portion of the corrugated foil is optically coupled to an edge portion of the light guide film.

16. A method as claim 13 recites, further comprising placing a light emitting diode (LED) die that produces the light adjacent to the first distal portion of the corrugated foil.

17. A method as claim 13 recites, wherein the light is transmitted in the corrugated foil via total internal reflection.

* * * * *